United States Patent [19]

Ishidoya et al.

[11] Patent Number: 5,196,503
[45] Date of Patent: Mar. 23, 1993

[54] RESIN COMPOSITION FOR USE AS PAINT

[75] Inventors: Masahiro Ishidoya, Kamakura; Kishio Shibato, Yokohama; Osamu Obe, Tokyo; Masaaki Kawasaki, Hiroshima, all of Japan

[73] Assignees: Nippon Oil and Fats Co., Ltd.; Mitsui Petrochemical Industries, Ltd., both of Tokyo, Japan

[21] Appl. No.: 735,054

[22] Filed: Jul. 24, 1991

Related U.S. Application Data

[62] Division of Ser. No. 564,024, Aug. 7, 1990, Pat. No. 5,091,492.

[30] Foreign Application Priority Data

Aug. 14, 1989 [JP] Japan ................... 1-207990

[51] Int. Cl.$^5$ ............... C08F 220/00; C08F 220/10; C08F 220/56
[52] U.S. Cl. ......................... 526/282; 526/284; 526/307.7; 526/328
[58] Field of Search ........................... 526/282

[56] References Cited

FOREIGN PATENT DOCUMENTS 62-141012  6/1987  Japan .

*Primary Examiner*—Joseph L. Schofer
*Assistant Examiner*—Wu C. Cheng
*Attorney, Agent, or Firm*—Darby & Darby

[57] ABSTRACT

A resin composition for use as a paint contains a copolymer prepared by copolymerizing a monomer (I) represented by the following formula (I):

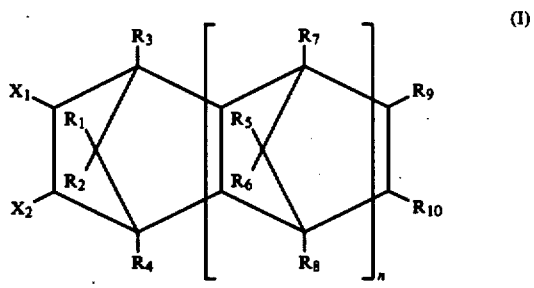

wherein either one of $X_1$ and $X_2$ stands for an acryloyloxy or methacryloyloxy group, the other being a hydrogen atom or an alkyl group having 1 to 6 carbon atoms; $R_1$ to $R_{10}$ each stand for a hydrogen atom or an alkyl group having 1 to 6 carbon atoms; and n is an integer of 1 to 4; with an $\alpha,\beta$-ethylenically unsaturated monomer having a reactive functional group and an $\alpha,\beta$-ethylenically unsaturated monomer having no reactive functional group. A monomer mixture for preparing the copolymer contains 5 to 95 wt % of the monomer (I).

22 Claims, No Drawings

RESIN COMPOSITION FOR USE AS PAINT

This is a division of application Ser. No. 07/564,024 filed Aug. 7, 1990, now U.S. Pat. No. 5,091,492.

BACKGROUND OF THE INVENTION

The present invention relates to a resin composition suited for use as a paint composition which gives a coating having improved apprearance and high hardness and excellent in weatherability, chemical resistance, solvent resistance and water resistance.

In recent years, in the field of paint technology, particularly for automobile finish, there is an increasing demand for a paint which gives an improved appearance of the paint film, i.e. improved smoothness and gloss. In order to comply with such a demand, it has been investigated to smoothen the paint film by controlling the flow characteristics during drying and curing of the paints or by reducing shrinkage during the drying or curing step. However, only few trials have been made to improve the gloss of the paint film by increasing the refractive index of the resin for paint. For instance, when the gloss of the coating is indicated by the Rs value (Gloss at 30 degrees measured by the Dorigon goniophoto meter produced by Hunter Lab.), it is difficult to provide a coating having an Rs value of not less than 86 unless the coating contains styrene. For example, the refractive indices of the homo-polymers of methyl methacrylate, butyl methacrylate, hexyl methacrylate, ethyl acrylate and butyl acrylate are so low as 1.490, 1.483, 1.481, 1.469 and 1.466, respectively, these monomers being generally used as the monomers for the preparation of acrylic resins for paint use. On one hand, although the fluorine-contained resins are improved in weatherability and attract public attention, the practical use thereof is delayed since they have low refractive indices ranging within 1.3 and 1.4 to make it hard to obtain paint films of good appearance. On the other hand, although the homopolymer of styrene has a high refractive index of 1.60, it is poor in weatherability and thus the use thereof for automobile finish is limited since the coatings applied on the automobiles must be durable for a long time.

It has generally been known that the interrelation between the chemical structure of an organic compound and the refractive index is indicated by the Lorentz-Lorentz's formula, i.e. the following formula (II):

$$\eta_D = \sqrt{(2\psi + 1)/(1 - \psi)}$$
$$\psi = \frac{[R]}{V}$$
(II)

wherein $\eta_D$ is the refractive index,
[R] is the molecular refraction,
[R]=$4\pi/3 \cdot N_A \cdot \alpha$ (where $N_A$ is the Avogadro number, and $\alpha$ is the polarizability.)
V is the molecular volume.
V=M/$\pi$ (where M is the molecular weight, and $\rho$ is the density)

Accordingly, in order to increase the refractive index of a compound, adopted is an approach in which the molecular refraction [R] is increased by introducing a chemical structure having a higher polarizability, or an approach in which the molecular volume V is decreased by introducing an atom which makes the density of the molecule to a higher value. In view of the foregoing standpoint, some organic optical materials having high refractive indices have been investigated in the field of plastics lens, and as the fruits of such investigations there are developed resins each containing a large amount of halogen atoms, such as chlorine and bromine, or a large amount of aromatic rings as the organic optical materials having large molecular refractions [R], and also developed are resins each containing a heavy metal, such as lead, barium or lanthanum as the organic optical materials having small molecular volumes V.

However, if a large amount of halogen atoms is included in a resin to provide a higher refractive index, the weatherability of the resin is deteriorated due to the chemical activity of the halogen atoms; whereas if a large amount of aromatic rings is included, the melting point of the monomer is raised to adversely affect the workability or operation efficiency at the polymerization step. on the other hand, the resins containing heavy metals are apt to breakdown at the points at which the metals are linked to the organic compounds, leading to poor chemical resistance, and thus the resins as such are not suited for use as paint applications.

Poly(meth)acrylate copolymers, prepared from monomer mixtures containing polycyclic (meth)acrylate monomers, have been proposed for use as optical materials for optical fibers, optical disks, optically sensible cards, plastic lens and transparent conductive sheets, since they are improved in transparency, heat resistance, chemical resistance, solvent resistance and mechanical strengths. More specifically, Japanese Patent Laid-Open Publication No. 8355/1988 discloses a (meth)acrylic ester comprised of a polycyclic alkyl (meth)acrylate; Japanese Patent Laid-Open Publication No. 141009/1987 discloses a poly(meth)acrylate copolymer having a particular intrinsic viscosity and glass transition temperature, the copolymer being comprised of a polymer prepared from a polycyclic (meth)acrylate monomer; Japanese Patent Laid-Open Publication No. 209114/1987 discloses a poly(meth)acrylate copolymer having a particular intrinsic viscosity and glass transition temperature, the copolymer being prepared by copolymerizing a polycyclic (meth)acrylate monomer with a (meth)acrylate monomer; and Japanese Patent Laid-Open Publication No. 141012/1987 discloses a poly(meth)acrylate copolymer having a particular intrinsic viscosity and glass transition temperature and containing substantially no gelled cross-linked polymer, the copolymer being prepared from a polycyclic (meth-)acrylate monomer, a (meth)acrylate monomer and a polyfunctional (meth)acrylate monomer having 2 to 4 (meth)acryloyloxy groups in one molecule.

However, all of the poly(meth)acrylate copolymers described above are developed to produce molded articles used as optical materials, such as plastic lens or the like, and thus it is difficult to use them directly as the resins for paints. Particularly, when a polyfunctional (meth)acrylate is used as one of the polymerizable ingredients as taught by Japanese Patent Laid-Open Publication No. 141012/1987, the viscosity of the resultant copolymer per se becomes higher to make it impossible to use the same as the resin for paint applications. Under these circumstances, there is an increasing demand for the development of a paint containing, as the coating-forming ingredient, a resin which has a high refractive index and is improved in weatherability, chemical resistance and water resistance to give a coating of high hardness.

SUMMARY OF THE INVENTION

An object of this invention is to provide a resin composition suited for use as a paint to give a paint film which has good appearance and a high hardness and is improved in weatherability, chemical resistance, solvent resistance and water resistance.

The above and other objects of the present invention will become more apparent from the following detailed description of the invention.

According to the present invention, there is provided a resin composition for use as a paint comprising a copolymer prepared by copolymerizing a monomer (I) represented by the following formula (I):

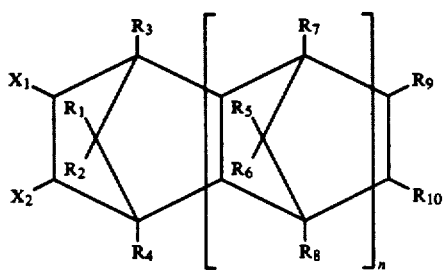

wherein either one of $X_1$ and $X_2$ stands for an acryloyloxy or methacryloyloxy group, the other being a hydrogen atom or an alkyl group having 1 to 6 carbon atoms; $R_1$ to $R_{10}$ each stand for a hydrogen atom or an alkyl group having 1 to 6 carbon atoms; and n is an integer of 1 to 4; with an $\alpha,\beta$-ethylenically unsaturated monomer having a reactive functional group and an $\alpha,\beta$-ethylenically unsaturated monomer having no reactive functional group, a monomer mixture for preparing the copolymer containing 5 to 95 wt % of the monomer (I).

DESCRIPTION OF PREFERRED EMBODIMENTS OF THE INVENTION

The present invention will be described in detail hereinbelow.

The resin composition suited for use as a paint, provided by the invention, contains a copolymer prepared by copolymerizing a particular monomer (I) with an $\alpha,\beta$-ethylenically unsaturated monomer having a reactive functional group and an $\alpha,\beta$-ethylenically unsaturated monomer having no reactive functional group, as an essential component.

The monomer (I) used in a monomer mixture for preparing the copolymer contained as the essential component in the composition of the invention may be represented by the following formula (I):

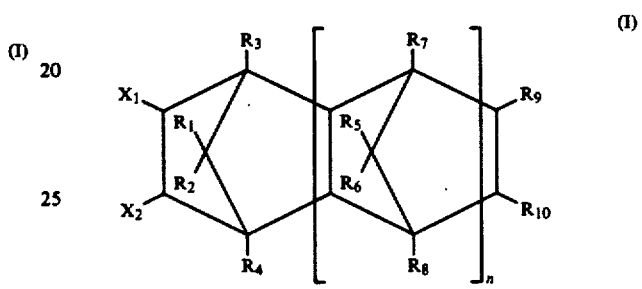

wherein either one of $X_1$ and $X_2$ stands for an acryloyloxy or methacryloyloxy group, the other being a hydrogen atom or an alkyl group having 1 to 6 carbon atoms; $R_1$ to $R_{10}$ each stand for a hydrogen atom or an alkyl group having 1 to 6 carbon atoms; and n is an integer of 1 to 4.

If at least one of $X_1$, $X_2$ and $R_1$ to $R_{10}$ is an alkyl group having 7 or more carbon atoms, or n is an integer of 5 or more, the preparation of the monomer becomes difficult.

Preferable examples of the monomer (I) represented by the formula (I) set forth above include those listed in the following Table 1.

TABLE 1

| Chemical Formula | Name of the Compound |
| --- | --- |
| $CH_2=C(H)-C(=O)-O-$ [structure] | Tetracyclo [$4.4.0.1^{2,5}.1^{7,10}$] dodecyl-3-acrylate |
| $CH_2=C(H)-C(=O)-O-$ [structure]-R | 9-substituted-tetracyclo [$4.4.0.1^{2,5}.1^{7,10}$] dodecyl-3-acrylate<br>R = metyl, ethyl, propyl, isobutyl, or hexyl |
| $CH_2=C(H)-C(=O)-O-$ [structure]-R | 8-substituted-tetracyclo [$4.4.0.1^{2,5}.1^{7,10}$] dodecyl-3-acrylate<br>R = methyl, ethyl, propyl, isobutyl, or hexyl |

TABLE 1-continued

| Chemical Formula | Name of the Compound |
|---|---|
| (structure) | 8,9-disubstituted-tetracyclo [4.4.0.1$^{2,5}$.1$^{7,10}$] dodecyl-3-acrylate<br>R,R' = methyl, ethyl, propyl, isobutyl, or hexyl |
| (structure) | 2,10-dimethyltetracyclo [4.4.0.1$^{2,5}$.1$^{7,10}$] dodecyl-3-acrylate |
| (structure) | 2,7-dimethyltetracyclo [4.4.0.1$^{2,5}$.1$^{7,10}$] dodecyl-3-acrylate |
| (structure) | Hexacyclo [6.6.1.1$^{3,6}$.1$^{10,13}$.0$^{2,7}$.0$^{9,14}$] heptadecyl-4-acrylate |
| (structure) | 11-methylhexacyclo [6.6.1.1$^{3,6}$.1$^{10,13}$.0$^{2,7}$.0$^{9,14}$] heptadecyl-4-acrylate |
| (structure) | 12-methylhexacyclo [6.6.1.1$^{3,6}$.1$^{10,13}$.0$^{2,7}$.0$^{9,14}$] heptadecyl-4-acrylate |
| (structure) | Tetracyclo [4.4.0.1$^{2,5}$.1$^{7,10}$] dodecyl-3-methacrylate |
| (structure) | 9-substituted-tetracyclo [4.4.0.1$^{2,5}$.1$^{7,10}$] dodecyl-3-methacrylate<br>R = methyl, ethyl, propyl, isobutyl, or hexyl |

TABLE 1-continued

| Chemical Formula | Name of the Compound |
|---|---|
| 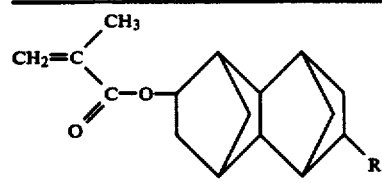 | 8-substituted-tetracyclo [4.4.0.1$^{2,5}$.1$^{7,10}$] dodecyl-3-methacrylate<br>R = methyl, ethyl, propyl, isobutyl, or hexyl |
| 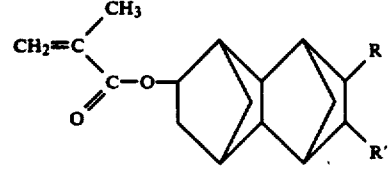 | 8,9-disubstituted-tetracyclo [4.4.0.1$^{2,5}$.1$^{7,10}$] dodecyl-3-methacrylate<br>R,R' = methyl, ethyl, propyl, isobutyl, or hexyl |
| 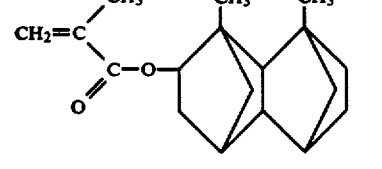 | 2,10-dimethyltetracyclo [4.4.0.1$^{2,5}$.1$^{7,10}$] dodecyl-3-methacrylate |
| 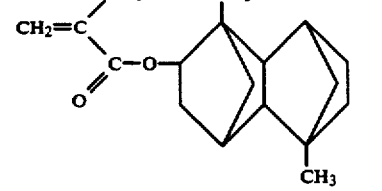 | 2,7-dimethyltetracyclo [4.4.0.1$^{2,5}$.1$^{7,10}$] dodecyl-3-methacrylate |
| 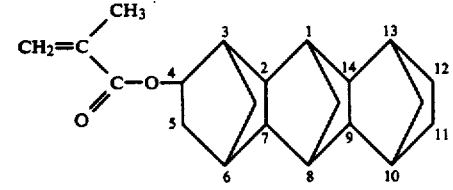 | Hexacyclo [6.6.1.1$^{3,6}$.1$^{10,13}$.0$^{2,7}$.0$^{9,14}$] heptadecyl-4-methacrylate |
| 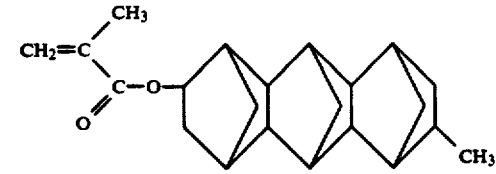 | 11-methylhexacyclo [6.6.1.1$^{3,6}$.1$^{10,13}$.0$^{2,7}$.0$^{9,14}$] heptadecyl-4-methacrylate |
| 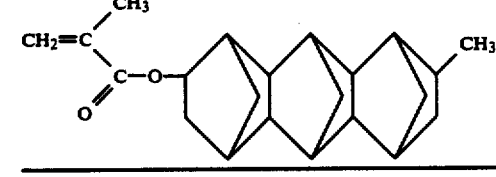 | 12-methylhexacyclo [6.6.1.1$^{3,6}$.1$^{10,13}$.0$^{2,7}$.0$^{9,14}$] heptadecyl-4-methacrylate |

The monomer (I) may be prepared, for example, by the process disclosed by Japanese Patent Laid-Open Publication No. 8355/1988. In detail, formic acid is added, through an addition reaction, to the unsaturated bond of a polycyclic olefin represented by the following formula (III):

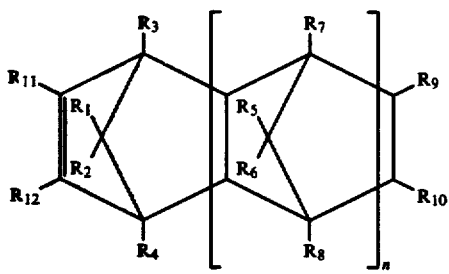

(III)

wherein $R_1$ to $R_{12}$ each stand for an hydrogen atom or an alkyl group having 1 to 6 carbon atoms, and n is an integer of 1 to 4; to prepare an formic ester of the polycyclic olefin, followed by hydrolysis to obtain a polycyclic alcohol which is reacted with (meth)acrylic acid or an ester thereof.

In the present invention, the content of the monomer (I) in the monomer mixture for the preparation of the copolymer which is the essential component of the composition of the invention range within 5 to 95 wt %. If the content of the monomer (I) is less than 5 wt %, the refractive index of the resultant coating cannot be increased to the desired level, leading to failure in improvement of the appearance of the paint film. On the contrary, if the content of the monomer (I) is more than 95 wt %, it becomes difficult to introduce a reactive functional group, leading to the result that the resultant coating becomes brittle to an extent not to suit for practical application. For these reasons, the content of the monomer (I) should be controlled within the defined range.

Any α,β-ethylenically unsaturated monomers each having a reactive functional group may be used without particular limitation to prepare the copolymer which is essentially contained in the composition of the invention, as far as they have reactive functional groups and are copolymerizable with the monomer (I). Preferable examples of such α,β-ethylenically unsaturated monomers each having a reactive functional group include monomers each having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, dipentaerythritol hexa(meth)acrylate, addition products of ε-caprolactone (monomer to decamer) of 2-hydroxyethyl (meth)acrylate, and addition products of ε-caprolactone (monomer to decamer) of 2-hydroxypropyl (meth)acrylate; monomers each having a carboxyl group, such as acrylic acid, methacrylic acid, itaconic acid, crotonic acid, maleic acid, and fumaric acid; monomers each having an epoxy group, such as glycidyl (meth)acrylate, methylglycidyl (meth)acrylate and vinylglycidyl ether; monomers each having an amide group, such as acrylamide and methacrylamide; monomers each having an aminomethylol group, such as N-methylolacrylamide and N-methylolmethacrylamide; monomers each having an alkylated aminomethyl ether group, such as N-methoxymethyl acrylamide, N-methoxymethyl methacrylamide, N-butoxymethyl acrylamide, N-butoxymethyl methacrylamide and methylacrylamideglycolate methyl ether; monomers each having an isocyanate group, such as isocyanate ethyl (meth)acrylate, m-isopropenyl-α,α-dimethylbenzyl isocyanate, a half-block product of isophorone diisocyanate and 2-hydroxyethyl (meth)acrylate, a half-block product of 1,6-hexamethylene diisocyanate and 2-hydroxyethyl (meth)acrylate, a half-block product of toluene diisocyanate and 2-hydroxyethyl (meth)acrylate, a half-block product of isophorone diisocyanate and 2-hydroxypropyl (meth)acrylate, a half-block product of 1,6-hexamethylene diisocyanate and 2-hydroxypropyl (meth)acrylate, and a half-block product of toluene diisocyanate and 2-hydroxypropyl (meth)acrylate; monomers each having a cyclocarbonate group, such as 4-(meth)acryloyloxymethyl-1,3-dioxolan-2-one and 4-(meth)acryloyloxyethyl-1,3-dioxolan-2-one; monomers each having an acetoacetoxyalkyl group, such as acetoacetoxyethyl acrylate and acetoacetoxyethyl methacrylate; monomers each having an amino group, such as aminoethyl (meth)acrylate, aminopropyl (meth)acrylate, methylaminoethyl (meth)acrylate, methylaminopropyl (meth)acrylate, ethylaminoethyl (meth)acrylate, ethylaminopropyl (meth)acrylate, dimethylaminoethyl (meth)acrylate, diethylaminopropyl (meth)acrylate, N-t-butylaminoethyl (meth)acrylate and N-t-butylaminopropyl (meth)acrylate; monomers each having an acid anhydride group, such as maleic anhydride and itaconic anhydride; monomers each having an alkenyl group and having no second terminal double bond, such as an esterification product of (meth)acrylic acid and perilla oil fatty acid glycidyl ester, an esterification product of (meth)acrylic acid and soybean oil fatty acid glycidyl ester, an esterification product of (meth)acrylic acid and safflower oil fatty acid glycidyl ester, an esterification product of (meth)acrylic acid and linseed oil fatty acid glycidyl ester, an esterification product of glycidyl (meth)acrylate and perilla oil fatty acid, an esterification product of glycidyl (meth)acrylate and soybean oil fatty acid, an esterification product of glycidyl (meth)acrylate and safflower oil fatty acid, an esterification product of glycidyl (meth)acrylate and linseed oil fatty acid, an esterification product of methylglycidyl (meth)acrylate and perilla oil fatty acid, an esterification product of methylglycidyl (meth)acrylate and soybean oil fatty acid, an esterification product of methylglycidyl (meth)acrylate and safflower oil fatty acid, and an esterification product of methylglycidyl (meth)acrylate and linseed oil fatty acid; and monomers each having an aziridine group, such as 2-(1-aziridinyl)ethyl methacrylate. These monomers may be used singly or in combination. The content of the α,β-ethylenically unsaturated monomer having a reactive functional group in the monomer mixture for the preparation of the copolymer may be varied depending on the desired refractive index, mechanical strengths such as hardness, strength and toughness, glass transition temperature which affects the pour point or thermally softening properties of the copolymer, desired resistance to chemicals including resistance to acids or alkalis, and also depending on the concentration of functional groups. However, it is desirous that the content of the α,β-ethylenically unsaturated monomer having a reactive functional group in the monomer mixture may range preferably from 1 to 80 wt %, more preferably from 5 to 60 wt %, based on the total weight of the monomer mixture.

Any α,β-ethylenically unsaturated monomers each having no reactive functional group may be used without particular limitation to prepare the copolymer which is essentially contained in the composition of the invention, as far as they have no reactive functional group and are copolymerizable with the monomer (I). Preferable examples of such α,β-ethylenically unsaturated monomers each having no reactive functional group include methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, cyclohexyl (meth)acrylate, benzyl (meth)acrylate, 2-ethylhexyl (meth)acrylate, stearyl (meth)acrylate, styrene, $\alpha$-methylstyrene, p-vinyltoluene and acrylonitrile. These compounds may be used singly or in combination. The content of the $\alpha,\beta$-ethylenically unsaturated monomer having no reactive functional group in the monomer mixture for the preparation of the copolymer may be selected properly depending on the desired properties of the resultant copolymer, and may range preferably from 1 to 80 wt %, more preferably from 5 to 60 wt %, based on the total weight of the monomer mixture.

In preparation of the copolymer contained in the composition of the present invention as the essential component, a monomer mixture containing the aforementioned monomers in combination may be polymerized in the presence of a radical polymerization initiator by any of the known radical polymerization processes, bulk polymerization processes, solution polymerization processes, emulsion polymerization processes and suspension polymerization processes. Examples of preferable radical polymerization initiators include organic peroxides, azo compounds and inorganic peroxides, specific examples being peroxides such as benzoyl peroxide, 2,4-dichlorobenzoyl peroxide, tert-butylperoxy-2-ethylhexanoate, tert-butylperoxybenzoate and dicumyl peroxide, azobis compounds such as azobisisobutylonitrile, azobis-2,4-dimethylvaleronitrile and dimethyl-2,2'-azobisisobutylate, inorganic peroxides such as potassium persulfate, and mixtures thereof. The ratio of the radical polymerization initiator added to the monomer mixture is varied depending on the adopted polymerization process, conditions for polymerization and the used copolymerizable monomers, and it is desirous that the ratio of the added polymerization initiator ranges preferably from 0.1 to 10 parts by weight, based on 100 parts by weight of the monomer mixture. The temperature and time for the polymerization may also be varied depending on the specific composition of the monomer mixture, the reactivity of the monomer mixture and the specific kind and added amount of the polymerization initiator, and it is desirous that the polymerization be carried out generally at 10° C. to 150° C. over a period of 1 to 100 hours. The molecular weight of the resultant copolymer is varied depending on the adopted polymerization process and not limited particularly, the preferable molecular weight of the copolymer ranging within 1,000 to 1,000,000.

The copolymer provided in accordance with the present invention may be used directly as one component of a paint resin composition. However, it may be further chemically modified to introduce a reactive functional group and then used as a copolymer having the thus introduced reactive functional group. For example, by emulsion polymerization in combination with a polyfunctional monomer having two or more $\alpha,\beta$-ethylenically unsaturated groups in one molecule to produce organic fine particles having internal cross-linked bonds. Such a copolymer may be used directly in an aqueous paint system, or the emulsion polymerization product is transferred into an organic solvent phase and then used as a component of a solvent-type paint. The copolymers of the invention may be processed through a non-aqueous dispersion polymerization process (NAD process) to prepare copolymers of organic fine powder form.

The resin composition for use as a paint, according to the invention, may contain a hardener which reacts with the copolymer to form therewith a cross-linking structure. A proper hardener may be selected from the following compounds depending on the reactive functional groups of the specific copolymer. When the copolymer has a hydroxyl and/or carboxyl group, usable hardeners include, for example, amino compounds such as melamine, urea and a condensation product of glycoluril with formaldehyde, the specific examples being monomeric melamine-formaldehyde resins such as hexamethoxymethylmelamine, hexa-n-butoxymethylmelamine, hexa-iso-butoxymethylmelamine, and methoxy-butoxy methyl melamine, and polymeric products obtained by polycondensation of the aforementioned melamine-formaldehyde resins. Further examples of the hardners are isocyanate compounds or blocked isocyanate compounds; the specific examples being p-phenylene diisocyanate, biphenyl diisocyanate, toluene diisocyante, 3,3'-dimethyl-4,4'-biphenylene diisocyanate, 1,4-tetramethylene diisocyanate, hexamethylene diisocyanate, 2,2,4-trimethylhexane-1,6-diisocyanate, methylenebis(phenylisocyanate), lysine methyl ester diisocyanate, bis(isocyanate ethyl) fumarate, isophorone diisocyanate, methylcyclohexyl diisocyanate, bullet or isocyanurates of these isocyanate compounds, blocked products of these compounds each blocked with a compound having an active hydrogen atom.

When the copolymer has a carboxyl group, an aziridine compound such as 2,2-bishydroxymethylbutanoltris [3-(1-aziridinyl)propyonate] and 1,6-hexamethylene diethylene urea, or a chelate-forming compound may be used as a hardener.

When the copolymer has an oxirane and/or cyclocarbonate group, a polyamine or polyamide compound may be used as a hardneer. Specific examples include ethylenediamine, hexamethylenediamine, triethylenetetramine, 3-diethylaminopropylamine, dibutylaminopropylamine, tetramethylethylenediamine, 4,9-dioxadodecane-1,12-diamine, 4,7,10-trioxatridecane-1,13-diamine, "Bis(3-aminopropyl)polytetrahydrofuran-750", "Bis(3-aminopropyl)polytetrahydrofuran-1100", "Bis(3-aminopropyl)polytetrahydrofuran-2100" (Trade Names, produced by BASF), polyamines produced by reducing reaction products of polyhydric alcohols and acrylonitrile, and polyamide compounds produced by condensation polymerization of the polyamines with polycarboxylic acids.

When the copolymer has an oxirane and/or hydroxyl group, a polycarboxylic acid and/or acid anhydride may be used as a hardener. Specific examples include, for example, phthalic anhydride, isophthalic acid, terephthalic acid, tetrahydrophthalic anhydride, hexahydrophthalic anhydride, maleic anhydride, fumaric acid, succinic acid, glutaric acid, adipic acid, trimethyladipic acid, sebacic acid, dodecanedicarboxylic acid, trimellitic anhydride, pyromellitic anhydride and butanetetracarboxylic acid.

When the copolymer has a carboxylic or amino group, a polyepoxy compound may be used as a hardner. Specific examples include "Epomic R130", "Epomic R140", "Epomic R301" and "Epomic R304" (Trade Names, produced by Mitsui Petrochemical Industries, Ltd.), "Epikote 828", "Epikote 834", "Epikote 1001" and "Epikote 1004" (Trade Names, produced by Shell International Chemical Corp.), "Epiclon 830", "Epiclon 840" and "Epiclon 850" (Trade Names, produced by Dainippon Ink and Chemicals, Incorporated), and "Epotohto YD-115", "Epotohto YD-011", "Epotohto YD-8124" and "Epotohto YD-120" (Trade Names, produced by Toto Kasei K.K.).

The quantity of the hardener added to the copolymer of this invention may be varied depending on the specific application of the paint composition. For instance, when the paint composition of this invention is used as a thermosetting paint composition, the mixing ratio of the copolymer and the hardener may be properly controlled in view of the used monomers, specific kind of the used hardener and the physical and chemical properties for the specific application. It is preferable that the mixing ratio of the monomer to the hardener be varied within the range of from 95:5 to 50:50. If the mixing ratio of the hardener is less than 5 parts, based on the 100 parts of the mixture, the density of the cross-linking structure in the hardened coating becomes too low to give the coating with satisfactory hardness, resistance to chemicals and resistance to solvents. On the contrary, if the mixing ratio of the hardener is more than 50 parts, based on 100 parts of the mixture, the resultant coating has excessive cross-linking structure to become brittle to an extent not to withstand for practical use. The temperature and time required for curing the paint composition of this invention are varied depending on the specific kind of the copolymer and the specific kind of the added hardener, and generally it may be cured at 50° C. to 200° C. for 2 minutes to an hour.

When the copolymer of this invention has an aminomethylol group or an alkenyl group having no terminal double bond, a hardner need not be used. When the copolymer has an aminomethylol group, the copolymer becomes self-curable; and when the copolymer has an alkenyl group having no terminal double bond, the copolymer may be cross-linked by drying at room temperature.

The resin composition provided by this invention may be used, without adding any coloring pigment or like, as a clear paint, or there may be added a coloring pigment, aluminium pigment or metallic pigment to be used as a colored paint, enamel paint or metallic paint. It may be used as a powder coating without using any solvent, or may be used as an organic solvent based coating or water based coating by using an organic solvent or water as the solvent or thinner. To the composition of this invention there may be added various additives commonly used for modifying or improving the paint compositions. Examples of additives which may be added to the composition of this invention are ultraviolet light absorbers such as 2-hydroxy-4-n-octoxybenzophenone and substituted products of benzotriazole, antioxidants such as hindered phenols and hindered amines, surface controlling agents such as silicone resins, catalysts for hardening and flow controlling agents. The resin composition of this invention may be prepared, coated and dried by the known technology to comply with the desired use.

The resin compositions of this invention are useful for various paint compositions since they give coatings of good appearance, each having an Rs value (gloss at 30 degrees measured by Dorigon goniophoto meter produced by Hunter Lab. generally in accordance with ASTM E 430) of not less than 86.

EXAMPLES OF THE INVENTION

The present invention will be described more in detail with reference to some Examples and Comparative Examples. However, it is noted that the following Examples are illustrative only and thus the invention should not be limited thereto. In the following Examples and Comparative Examples, "part" stands for "part by weight", and "%" stands for "% by weight".

Referential Experiments Preparation of Copolymers A to O:

Into a flask equipped with a stirrer, a thermometer, a reflux condenser, a nitrogen gas introducing tube and a dropping funnel, charged were 70 parts of xylene, which was heated to 140° C. under stirring while introducing a nitrogen gas into the flask, and then each of the mixtures of monomers with each of the polymerization initiators as set forth in Table 2 was added dropwise at a constant rate over a period of 2 hours from the dropping funnel while maintaining the temperature constantly at 140° C.. After the completion of dropwise addition, the contents in the flask were maintained at 140° C. for 30 minutes, and then 0.2 part of t-butyl-peroxy-2-ethylhexanoate was added and the content of the flask was maintained at 140° C. for additional 2 hours, whereby each of copolymer solutions A to M having the properties as set forth in Table 2 was obtained.

The copolymers N and O were synthesized as follows. Into a flask same as used in the procedure as described in the preceding paragraph, charged were 149 parts of n-butyl acetate which was heated to 125° C. under stirring while introducing a nitrogen gas into the flask, and then each of the mixtures of monomers and each of the polymerization initiators as set forth in Table 3 were added dropwise from the dropping funnel at a constant rate over a period of 2 hours while maintaining the temperature of the content in the flask at 125° C.. After the completion of dropwise addition, the contents in the flask were maintained at 125° C. for 30 minutes, an additional amount of a polymerization initiator was added and the content in the flask was maintained at 125° C. for additional 2 hours. Then, the mixture in the flask was cooled to 100° C., and each of the mixtures of fatty acid derivatives having the compositions as set forth in Table 3 was added. The admixture in the flask was heated again to 125° C. under stirring and maintained at that temperature while continuing stirring until the acid value of the admixture solution reached less than 1. The reaction was stopped to obtain copolymer solutions N and O each having the properties as set forth in Table 3.

TABLE 2

|  |  | Copolymer |  |  |  |  |  |  |
|---|---|---|---|---|---|---|---|---|
|  |  | A | B | C | D | E | F | G |
| Monomer a) | TD-A | 5.00 | 20.00 | 50.00 | 70.00 | 50.00 | 50.00 |  |
|  | TD-MA |  |  |  |  |  |  |  |
|  | HEMA | 13.02 | 13.02 | 13.02 |  |  |  | 13.02 |
|  | HEA |  |  |  | 11.61 |  |  |  |
|  | AA | 1.44 | 1.44 | 1.44 | 1.44 | 7.20 |  | 1.44 |

TABLE 2-continued

|  |  |  |  |  |  |  |  |
|---|---|---|---|---|---|---|---|
| BMA | 75.25 | 53.31 | 9.45 |  | 16.85 | 11.07 | 12.44 |
| STMA |  |  |  | 6.84 |  |  |  |
| MMA |  |  |  |  |  |  | 50.00 |
| ST |  |  |  |  |  |  |  |
| EHA | 5.29 | 12.23 | 26.09 | 10.11 | 25.95 | 24.73 | 23.10 |
| GMA |  |  |  |  |  | 14.20 |  |
| Polymerization Initiator Perbutyl O b) | 5.5 | 5.0 | 5.0 | 5.0 | 5.0 | 5.0 | 5.5 |
| Total Amount (wt. Part) | 105.5 | 105.0 | 105.0 | 105.0 | 105.0 | 105.0 | 105.5 |
| Properties c) Heating Residue (%)¹⁾ | 60.3 | 60.0 | 59.8 | 60.2 | 60.1 | 60.4 | 60.3 |
| Content of Hydroxyl (mol/kg) | 1.0 | 1.0 | 1.0 | 1.0 |  |  | 1.0 |
| Content of Acid (mol/kg) | 0.2 | 0.2 | 0.2 | 0.2 | 1.0 |  | 0.2 |
| Content of Epoxy (mol/kg) |  |  |  |  |  | 1.0 |  |
| Glass Transition Temp. (°C.) | 20 | 20 | 20 | 40 | 20 | 20 | 20 |
| Weight Average Molecular Weight | 8400 | 8800 | 8600 | 7800 | 8200 | 8500 | 8400 |
| Gardner Viscosity (at 25° C.) | W-X | X-Y | X | V | $Z-Z_1$ | Y-Z | Z |

|  |  | Copolymer | | | | | |
|---|---|---|---|---|---|---|---|
|  |  | H | I | J | K | L | M |
| Monomer a) | TD-A |  |  |  |  |  |  |
|  | TD-MA |  |  |  | 20 | 50 | 70 |
|  | HEMA | 13.02 |  |  | 13.02 | 13.02 |  |
|  | HEA |  |  |  |  |  | 11.61 |
|  | AA | 1.44 | 7.20 |  | 1.44 | 1.44 | 1.44 |
|  | BMA | 13.36 | 19.84 | 14.06 | 50.87 | 3.34 |  |
|  | STMA |  |  |  |  |  | 10.54 |
|  | MMA |  |  | 50.00 | 50.00 |  |  |
|  | ST | 50.00 |  |  |  |  |  |
|  | EHA | 22.18 | 22.96 | 21.74 | 14.67 | 32.20 | 6.41 |
|  | GMA |  |  | 14.20 |  |  |  |
| Polymerization Initiator Perbutyl O b) |  | 7.0 | 5.5 | 5.5 | 6.0 | 6.0 | 6.0 |
| Total Amount (wt. Part) |  | 107.0 | 105.5 | 105.5 | 106.0 | 106.0 | 106.0 |
| Properties c) Heating Residue (%)¹⁾ |  | 60.5 | 60.2 | 60.1 | 60.8 | 60.7 | 60.5 |
| Content of Hydroxyl (mol/kg) |  | 1.0 |  |  | 1.0 | 1.0 | 1.0 |
| Content of Acid (mol/kg) |  | 0.2 | 1.0 |  | 0.2 | 0.2 | 0.2 |
| Content of Epoxy (mol/kg) |  |  |  | 1.0 |  |  |  |
| Glass Transition Temp. (°C.) |  | 20 | 20 | 20 | 20 | 20 | 55 |
| Weight Average Molecular Weight |  | 8000 | 8100 | 8700 | 8900 | 9000 | 8400 |
| Gardner Viscosity (at 25° C.) |  | $Z_1-Z_2$ | $Z_4-Z_5$ | $Z-Z_1$ | Y-Z | Z | $Z_4-Z_5$ | a) Monomer
TD-A; Tetracyclo [4.4.0.1² ⁵.1⁷ ¹⁰] dodecyl-3-acrylate.
TD-MA; Tetracyclo [4.4.0.1² ⁵.1⁷ ¹⁰] dodecyl-3-methacrylate.
HEMA; 2-hydroxyethyl methacrylate.
HEA; 2-hydroxyethyl acrylate.
AA; Acrylic acid.
BMA; n-butylmethacrylate.
STMA; Stearyl methacrylate.
MMA; Methyl methacrylate.
ST; Styrene.
EHA; 2-ethylhexyl acrylate.
GMA; Glycidyl methacrylate.
b) [Perbutyl O]; Trade Name t-butylperoxy-2-ethylhexanoate (produced by Nippon Oil and Fats Co., Ltd.)
c) The content of hydroxyl, the content of acid, the content of epoxy, the glass transition temperature and weight average molecular weight are the values determined as of the residue after heating.
¹⁾The heating residue was determined in accordance with JIS K 5400 8.2. (1979).

TABLE 3

|  |  | Copolymer | |
|---|---|---|---|
|  |  | N | O |
| Monomer and Polymerization Initiator | TD-A | 85.0 |  |
|  | MMA |  | 85.0 |
|  | AA | 2.3 | 2.3 |
|  | Perbutyl O | 1.0 | 1.5 |
| Additional Catalyst | Perbutyl O | 0.1 | 0.1 |
| Mixture of Fatty Acid Derivatives | Blemmer SB a) | 12.7 | 12.7 |
|  | Hydroquinone | 0.25 | 0.25 |
|  | Tetrabutyl Ammonium Chloride | 0.10 | 0.10 |
| Properties | Residue after Heating (%) | 40.3 | 40.5 |
|  | Iodine Value b) | 13 | 13 |
|  | Weight Average Molecular Weight | 36,000 | 38,000 |
|  | Gardner Viscosity (at 25° C.) | V-W | T-U |

Note:
a) "Blemmer SB": Trade Name, produced by Nippon Oil and Fats Co., Ltd., Soybean Oil Fatty Acid Glycidyl Ester, Epoxy Equivalent = 400, Iodine Value = 105
b) The iodine value and weight average molecular weight were the values of the residue after heating.

EXAMPLES 1 TO 10 AND COMPARATIVE EXAMPLES 1 TO 3

Two-Coat, 1-Bake, Metallic (A) Preparation of Clear Paint

Each of the paints having the compositions as set forth in Table 4 was prepared by using each of the copolymer solutions A to D, G, H and K to M. Each paint was diluted with a thinner (xylene/n-butyl alcohol=9/1 by weight ratio) to have a viscosity suited for coating (25 seconds at 20° C. when measured by using Ford Cup No. 4) to obtain a clear paint.

TABLE 4

| | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Copolymer Solution | A | 116.7 | | | | | | | | | | | | |
| | B | | 116.7 | | | 87.8 | | | | | | | | |
| | C | | | 116.7 | | | 58.3 | | | | | | | |
| | D | | | | 116.7 | | | 29.2 | | | | | | |
| | G | | | | | | | | | | | 116.7 | 58.3 | |
| | H | | | | | | | | | | | | | 116.7 |
| | K | | | | | | | | 116.7 | | | | | |
| | L | | | | | | | | | 116.7 | | | | |
| | M | | | | | | | | | | 116.7 | | | |
| Fluorine-contained Resin Solution a) | | | | | | 26.9 | 53.8 | 80.8 | | | | | 53.8 | |
| Amino Resin Solution b) | | 50.0 | 50.0 | 50.0 | 50.0 | 50.0 | 50.0 | 50.0 | 50.0 | 50.0 | 50.0 | 50.0 | 50.0 | 50.0 |
| Ultraviolet Light Absorber Solution c) | | 10.0 | 10.0 | 10.0 | 10.0 | 10.0 | 10.0 | 10.0 | 10.0 | 10.0 | 10.0 | 10.0 | 10.0 | 10.0 |
| Light Stabilizer Solution d) | | 5.0 | 5.0 | 5.0 | 5.0 | 5.0 | 5.0 | 5.0 | 5.0 | 5.0 | 5.0 | 5.0 | 5.0 | 5.0 |
| Levelling Agent e) | | 1.0 | 1.0 | 1.0 | 1.0 | 1.0 | 1.0 | 1.0 | 1.0 | 1.0 | 1.0 | 1.0 | 1.0 | 1.0 |
| Xylene | | 6.0 | 6.0 | 6.0 | 6.0 | 6.0 | 6.0 | 6.0 | 6.2 | 6.0 | 6.0 | 6.0 | 6.0 | 6.0 |
| n-Butyl Alcohol | | 2.0 | 2.0 | 2.0 | 2.0 | 2.0 | 2.0 | 2.0 | 2.0 | 2.0 | 2.0 | 2.0 | 2.0 | 2.0 | a) [Lumiflon LF946] (Trade name, produced by Asahi Glass Company, Limited, Hydroxyl Value = 75, Acid Value = 5, Heating Residue = 65%)
b) [Superbeckamine J-820-60] (Trade name, produced by Dainippon Ink and Chemicals, Incorporated, Solution of a butylated melamine resin, Heating Residue = 60%)
c) [Tinuvin 900] (Trade name, produced by Ciba Geigy Japan, a 10% solution of a derivative of benzotriazol in xylene)
d) [Sanol LS292] (Trade name, produced by Sankyo Company, Limited, a 20% solution of bis(1,2,2,6,6-pentamethyl-4-pypedyl) sebacate in xylene)
e) [Modaflow] (Trade name, produced by Monsanto Inc., a 10% solution in xylene)

cl (B) Preparation of Coating

A cationic electrodeposition paint "Aqua No. 4200" (Trade Name, produced by Nippon Oil and Fats, co., Ltd.) was coated by electrodeposition on a mild steel plate treated with zinc phosphate to form a coating of 20 μm thickness at dry film, and the coating was baked at 175° C. for 25 minutes. A sealer "Epico No. 1500CP Sealer" (Trade Name produced by Nippon Oil and Fats Co., Ltd.) was coated by air spraying to form a coating of 40 μm thickness at dry film, and the sealer was baked at 140° C. for 30 minutes to prepare a test plate.

A silver metallic base coat paint "Belcoat No. 6000" (Trade Name, produced by Nippon Oil and Fats Co., Ltd.) was coated on the test plate prepared as aforementioned by air spraying at two stages at an interval of 1 minute and 30 seconds to form a coating of 15 μm thickness at dry film, followed by setting at 20° C. for 3 minutes, and then each clear paint (A) was coated by air spraying and baked at 140° C. for 30 minutes.

The properties of the coatings are shown in Table 5. In each of the Examples 1 to 4 and Examples 8 to 10 in which acrylic copolymers were used and also in each of Examples 5 to 7 in which a fluorine-contained resin having a low refractive index was blended, each coating had improved appearance (having a high Rs value), acid resistance, solvent resistance, weatherability, water resistance and high hardness. In contrast thereto, the coatings prepared by Comparative Examples 1 and 2 had low refractive indices since they did not contain monomer (I), the refractive index of the coating of Comparative Example 1 being 1.512 which is lower than the refractive indices ranging within 1.521 to 1.558 as in Examples 1 to 4 and 8 to 10 and the refractive index of the coating of Comparative Example 2 being 1.498 which is significantly lower than the refractive index 1.541 as in Example 6. As a result, the appearances of the coatings of Comparative Examples were too poor to have an Rs value of 84 in Comparative Example 1 which was lower than the Rs values ranging within 90 to 97 as in Examples 1 to 4 and 8 to 10, and to have an Rs value of 80 in Comparative Example 2 which was lower than the refractive index 92 as in Examples 6. The hardnesses of the coatings of Comparative Examples were lower than those of the coatings of Examples of the invention such that the hardness of the coating of Comparative Example 1 was 10.1 as compared to the refractive indices ranging within 12.5 to 16.0 as in Examples 1 to 4 and 8 to 10, and the hardness of the coating of Comparative Example 2 was 10.3 as compared to the refractive index 14.3 of the coating of Example 16. It was further found that the coatings of Comparative Examples were inferior to the coatings of Examples of this invention as to the acid resistance and the water resistance.

Since a large amount of styrene was used to prepare the copolymer used in Comparative Example 3, the coating of Comparative Example 3 was extremely inferior particularly in weatherability.

TABLE 5

| | | Example | | | | | | | | | |
|---|---|---|---|---|---|---|---|---|---|---|---|
| | | 1 | 2 | 3 | 4 | 5 | 6 | 7 | 8 | 9 | 10 |
| Copolymer | Content of Monomer (I) in Copolymer (%) | 5 | 20 | 50 | 70 | 20 | 50 | 70 | 20 | 50 | 70 |
| | Reactive Functional Group in Copolymer | OH COOH | OH COOH | OH COOH | OH COOH | OH COOH | OH COOH | OH COOH | OH COOH | OH COOH | OH COOH |
| Blend Polymer | Copolymer/Fluorine-Contained Resin | — | — | — | — | 75/25 | 50/50 | 25/75 | — | — | — |
| Hardener | Ratio of Main Ingredient to Amino Compound (Main Ingredient/Amino Compound) | 70/30 | 70/30 | 70/30 | 70/30 | 70/30 | 70/30 | 70/30 | 70/30 | 70/30 | 70/30 |
| Coating System | | 2 clb Metallic | | | | | | | | | |
| Condition for Hardening | | 140° C. × 30 min. | | | | | | | | | |
| Properties of Coating | Refractive Index (at 20° C.) | 1.521 | 1.530 | 1.549 | 1.557 | 1.524 | 1.541 | 1.550 | 1.531 | 1.550 | 1.558 |
| | Appearance of Coating (Rs Value) a) | 90 | 92 | 94 | 96 | 93 | 92 | 93 | 92 | 94 | 97 |

TABLE 5-continued

|  |  |  |  |  |  |  |  |  |  |
|---|---|---|---|---|---|---|---|---|---|
| Acid Resistance b) | Fair | Fair | Fair | Fair | Fair | Fair | Fair | Fair | Fair | Fair |
| Solvent Resistance c) | Fair | Fair | Fair | Fair | Fair | Fair | Fair | Fair | Fair | Fair |
| Weatherability d) | Fair | Fair | Fair | Fair | Fair | Fair | Fair | Fair | Fair | Fair |
| Water Resistance e) | Fair | Fair | Fair | Fair | Fair | Fair | Fair | Fair | Fair | Fair |
| Hardness f) | 12.5 | 13.2 | 14.2 | 15.2 | 13.5 | 14.3 | 14.8 | 13.4 | 14.7 | 16.0 |

|  |  |  | Comparative Example | | |
|---|---|---|---|---|---|
|  |  |  | 1 | 2 | 3 |
| Copolymer | Content of Monomer (I) in Copolymer (%) |  | — | — | — |
|  | Reactive Functional Group in Copolymer |  | OH COOH | OH COOH | OH COOH |
| Blend Polymer | Copolymer/Fluorine-Contained Resin |  | — | 50/50 | — |
| Hardener | Ratio of Main Ingredient to Amino Compound (Main Ingredient/Amino Compound) |  | 70/30 | 70/30 | 70/30 |
| Coating System |  |  |  | 2 clb Metallic | |
| Condition for Hardening |  |  |  | 140° C. × 30 min. | |
| Properties of Coating | Refractive Index (at 20° C.) |  | 1.512 | 1.498 | 1.556 |
|  | Appearance of Coating (Rs Value) a) |  | 84 | 80 | 96 |
|  | Acid Resistance b) |  | Serious Marks of Stain | Serious Marks of Stain | Fair |
|  | Solvent Resistance c) |  | Fair | Fair | Fair |
|  | Weatherability d) |  | Fair | Fair | Cracking Occurred after 1500 hrs. |
|  | Water Resistance e) |  | Slight Blister | Slight Blister | Slight Blister |
|  | Hardness f) |  | 10.1 | 10.3 | 11.2 | a) Rs Value: Gloss at 30 degrees (measured by using Dorigon Goniophoto Meter produced by Hunter Lab.)
b) Acid Resistance: Two ml. of a 40% sulfuric acid solution was spotted on a test specimen, and allowed for standing at 20° C. for 24 hours and then the coating was visually examined to find any abnormalities if occurred.
c) Solvent Resistance: The coating was rubbed with plied 10 sheets of gauze for eight reciprocal times, and then the coating was visually examined to find any abnormalities if occurred.
d) Weatherability: After exposing for 3000 hours in the fluorescence-ultraviolet Light Weather meter (ASTM-G-53-77), and then the coating was visually examined to find any abnormalities if occurred.
e) Water Resistance: The test specimen was allowed to stand in an air-conditioned chamber maintained at a temperature of 50° C. and a humidity of 95% for 240 hours, and then the coating was visually observed to find if the specimen was blistered.
f) Hardness: Measured at 20° C. while using the Model M Micro Hardness Tester produced by Shimazu Corporation. The coating is harder as the value becomes larger.

EXAMPLES 11 TO 13 AND COMPARATIVE EXAMPLES 4 TO 6

Two-Component, 1-Coat, Solid Paint

(A) Preparation of Paint

Each of the compositions, except hardeners, as set forth in Table 6 was charged in a paint shaker to disperse the same until a particle size of less than 10 μm was obtained, whereby two-component type paints were prepared, respectively.

TABLE 6

|  |  | Example | | | Comparative Example | | |
|---|---|---|---|---|---|---|---|
|  |  | 11 | 12 | 13 | 4 | 5 | 6 |
| Copolymer | C | 83.3 |  |  |  |  |  |
| Solution | E |  | 83.3 |  |  |  |  |
|  | F |  |  | 83.3 |  |  |  |
|  | G |  |  |  | 83.3 |  |  |
|  | I |  |  |  |  | 83.3 |  |
|  | J |  |  |  |  |  | 83.3 |
| Titanium Dioxide a) |  | 48.0 | 46.0 | 44.4 | 48.0 | 46.0 | 44.4 |
| Xylene |  | 5.0 | 5.0 | 5.0 | 5.0 | 5.0 | 5.0 |
| n-Butyl Acetate b) |  | 2.0 | 2.0 | 2.0 | 2.0 | 2.0 | 2.0 |
| Levelling Agent |  | 0.7 | 0.7 | 0.7 | 0.7 | 0.7 | 0.7 |
| Hardner c) | Isocyanate Compound | 10.0 |  |  | 10.0 |  |  |
|  | Aziridine Compound |  | 8.4 |  |  | 8.4 |  |
|  | Polyamine |  |  | 5.8 |  |  | 5.8 |

TABLE 6-continued

|  | Example | | | Comparative Example | | |
|---|---|---|---|---|---|---|
|  | 11 | 12 | 13 | 4 | 5 | 6 |
| Compound |  |  |  |  |  |  | a) [TEIKA Titanium Oxide JR-602] (Trade name, produced by Teikoku Kako K.K., Rutile-type Titanium Dioxide)
b) [Modaflow] (Trade name, produced by Monsanto Inc., a 10% solution in xylene)
c) Isocyanate Compound; [Coronate EH] (Trade name, produced by Nippon Polyurethane Industry K.K., Trimer of Hexamethylene Diisocyanate, Content of Isocyanate Group; 21%, Heating Residue; 100%
Aziridine Compound; [Chemitite PZ-33] (Trade name, produced by Nippon Shokubai Kagaku Kogyo Co., Ltd., 2,2-Bishydroxymethylbutanol-tris[3-(1-aziridinyl)propionate], Percentage of Effective Component; 85%
Polyamine Compound; 4,7,10-Trioxatridecane-1, 13-diamine (produced by BASF A.G., Molecular Weight; 220.3, Percentage of Effective Component; 95%)

(B) Preparation of Coating

Immediately after adding each hardner to each to the two-component type paints set forth in Table 6, the admixture was diluted under stirring with a thinner (xylene/n-butyl acetate=7/3 by weight ratio) to have a viscosity suited for coating (25 seconds at 20° C. when measured by Ford Cup No. 4).

Thereafter, similarly to Examples 1 to 10, each of the paints was coated by air spraying on the test plate, which had been coated with the electrodeposition coating and the sealer, and then baked at 80° C. for 30 minutes.

The properties of the resultant coatings are shown in Table 7. Examples 11 to 13 gave coatings having improved appearances (having high Rs values), acid resistances, solvent resistances, weatherability, water resistance and high hardnesses. On the contrary, the coatings of Comparative Examples 4 to 6 which did not contain monomer (I) had low refractive indices such that the coating of Comparative Example 4 had a refractive index of 1.508 which was lower than the refractive index 1.545 as in Example 11, the coating of Comparative Example 5 had a refractive index of 1.505 which was lower than the refractive index 1.542 as in Example 12, and the coating of Comparative Example 6 had a refractive index of 1.507 which was lower than the refractive index 1.544 as in Example 13. Accordingly, the appearances of the coatings of Comparative Examples were too poor to have an Rs value of 81 in Comparative Example 4 as compared to the Rs value 93 as in Example 11, to have an Rs value of 80 in Comparative Example 5 as compared to the Rs value 92 as in Example 12, and to have an Rs value of 82 in Comparative Example 6 as compared to the Rs value 93 as in Example 13. The hardnesses of the coatings of comparative Examples were lower than those of the coatings of Examples of the invention such that the hardness of the coating of Comparative Example 4 was 10.2 as compared to the hardness 13.4 of Example 11, the hardness of the coating of Comparative Example 5 was 10.8 as compared to the hardness 14.2 of Example 12, and the hardness of the coating of Comparative Example 6 was 6.1 as compared to the hardness 9.5 of Example 13. It was further found that the coatings of Comparative Examples were inferior to the coatings of Examples of this invention as to the acid resistance and the water resistance.

(B) Preparation of Coating

After adding a drier to each of the air drying type paints set forth in Table 8, the admixture was diluted under stirring with a thinner (xylene/n-butyl acetate=5/5 by weight ratio) to have a viscosity suited for coating (18 seconds at 20° C. when measured by Ford Cup No. 4).

Thereafter, similarly to Examples 1 to 10, each of the paints was coated by air spraying on the test plate, which had been coated with the electrodeposition coating and the sealer, and then dried at room temperature for 14 days.

The properties of the resultant coatings are shown in Table 9. Example 14 gave a coating having an improved appearance (having a high Rs value), acid resistance, solvent resistance, weatherability, water resistance and a high hardness. On the contrary, since the coating of Comparative Example 7 did not contain the copolymer composed of the monomer (I), the refractive index thereof was 1.503 which was lower than the refractive index 1.558 as in Example 14, while the coating of Comparative Example had poor appearance such that the Rs value was 81 as compared to 98 obtained in Example 14. The hardness of the coating of Comparative Example 7 was 14.1 which was lower than the heardness 18.5 of the coating of Example 14. It was further found that the coating of Comparative Example 7 was inferior to the coating of Example 14 as to the acid resistance and the water resistance.

TABLE 7

| | | | Example | | | Comparative Example | | |
|---|---|---|---|---|---|---|---|---|
| | | | 11 | 12 | 13 | 4 | 5 | 6 |
| Copolymer | Content of Monomer (I) in Copolymer (%) | | 50 | 50 | 50 | — | — | — |
| | Reactive Functional Group in Copolymer | | OH COOH | COOH | \_/O | OH COOH | COOH | \_/O |
| Hardener | | | Isocyanate Compound | Aziridine Compound | Polyamine Compound | Isocyanate Compound | Aziridine Compound | Polyamine Compound |
| Coating System | | | Two Component Type, One Coat, Solid | | | | | |
| Condition for Hardening | | | 80° C. × 30 min. | | | | | |
| | Refractive Index (at 20° C.) | | 1.545 | 1.542 | 1.544 | 1.508 | 1.505 | 1.507 |
| | Appearance of Coating (Rs Value) | a) | 93 | 92 | 93 | 81 | 80 | 82 |
| Properties of Coating | Acid Resistance | b) | Fair | Fair | Fair | Slight Marks of Stain | Serious Marks of Stain | Serious Marks of Stain |
| | Solvent Resistance | c) | Fair | Fair | Fair | Fair | Fair | Fair |
| | Weatherability | d) | Fair | Fair | Fair | Chalking found after 1200 hrs. | Chalking found after 1100 hrs. | Chalking found after 1300 hrs. |
| | Water Resistance | e) | Fair | Fair | Fair | Slight Blister | Slight Blister | Slight Blister |
| | Hardness | f) | 13.4 | 14.2 | 9.5 | 10.2 | 10.8 | 6.1 | a) to c), e) and f) are the same as the foot notes in Table 5.
d) Weatherability: After exposing for 1500 hours in the Sunshine Weather Meter (JIS D 0205 7.6) (1976), the coating was visually observed to find any abnormalities if occurred.

EXAMPLE 14 AND COMPARATIVE EXAMPLE 7

Air Drying Type, 1-Coat, Solid Paint (A) Preparation of Paint

Each of the compositions, except dryers, as set forth in Table 8 was charged in a paint shaker to disperse the same until a particle size of less than 10 μm was obtained, whereby air drying type paints were prepared, respectively.

TABLE 8

| | Example 14 | Comparative Example 7 |
|---|---|---|
| Copolymer N Solution O | 125.0 | 125.0 |
| Titanium Dioxide a) | 40.0 | 40.0 |
| Xylene | 30.0 | 30.0 |
| n-Butyl Acetate | 20.0 | 20.0 |
| Levelling Agent b) | 1.0 | 1.0 |
| Dryer c) | 0.5 | 0.5 |

Note:
a), b): The same as in the foot notes of Table 6.
c): A solution of cobalt naphthenate in xylene (Content of Cobalt: 6%).

TABLE 9

| | Example 14 | Comparative Example 7 |
|---|---|---|
| Content of Monomer (I) (%) in Copolymer | 85 | 0 |
| Reactive Functional Group in Copolymer | —CH=CH— g) | —CH=CH— g) |
| Coating System | Air Drying type, 1-Coat, Solid | |
| Properties of Coating Refractive Index (at 20° C.) | 1.558 | 1.503 |
| Appearance (Rs Value) a) | 98 | 81 |
| Acid Resistance b) | Fair | Serious Marks of Stain |
| Solvent Resistance c) | Fair | Serious Scratch |
| Weatherability d) | Fair | Chalking found after 800 hrs. |
| Water Resistance e) | Fair | Slight Blister |
| Hardness f) | 19.5 | 15.3 |

Note:
a) to f) are the same as the foot notes of Table 5.
g) Alkenyl group having no double bond at the terminal carbon atom and present in the soybean oil fatty acid.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A resin composition for use as paint comprising a copolymer prepared by copolymerizing
a monomer (I) represented by the following formula

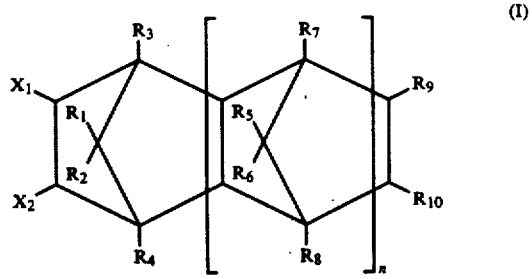

wherein one of $X_1$ and $X_2$ stands for an acryloyloxy or methacryloyloxy group, with the other being a hydrogen atom or an alkyl having 1 to 6 atoms; $R_1$ and $R_{10}$ each stand for a hydrogen atom of an alkyl group having 1 to 6 carbon atoms; and n is an integer of 1 to 4;
with a monomer having a single $\alpha,\beta$-ethylenically unsaturated site and a reactive functional group and
with a $\alpha,\beta$-ethylenically unsaturated monomer having no reactive functional group, wherein the monomer mixture used for preparing said copolymer contains between 5 to 95 wt % of said monomer (I).

2. The resin composition according to claim 1, wherein said monomer (I) is selected from the group consisting of the compounds set forth below:

| Chemical Formula | Name of the Compound |
|---|---|
| (structure) | Tetracyclo [4.4.0.1$^{2,5}$.1$^{7,10}$] dodecyl-3-acrylate |
| (structure) | 9-substituted-tetracyclo [4.4.0.1$^{2,5}$.1$^{7,10}$] dodecyl-3-acrylate<br>R = metyl, ethyl, propyl, isobutyl, or hexyl |
| (structure) | 8-substituted-tetracyclo [4.4.0.1$^{2,5}$.1$^{7,10}$] dodecyl-3-acrylate<br>R = methyl, ethyl, propyl, isobutyl, or hexyl |
| (structure) | 8,9-disubstituted-tetracyclo [4.4.0.1$^{2,5}$.1$^{7,10}$] dodecyl-3-acrylate<br>R,R' = methyl, ethyl, propyl, isobutyl, or hexyl |

-continued

| Chemical Formula | Name of the Compound |
|---|---|
| 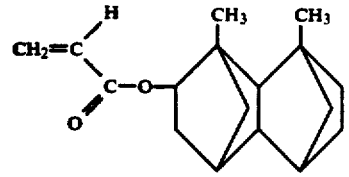 | 2,10-dimethyltetracyclo [4.4.0.1$^{2,5}$.1$^{7,10}$] dodecyl-3-acrylate |
| 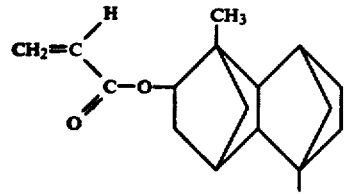 | 2,7-dimethyltetracyclo [4.4.0.1$^{2,5}$.1$^{7,10}$] dodecyl-3-acrylate |
| 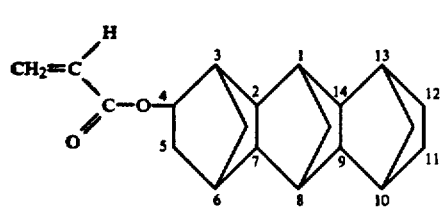 | Hexacyclo [6.6.1.1$^{3,6}$.1$^{10,13}$.0$^{2,7}$.0$^{9,14}$] heptadecyl-4-acrylate |
| 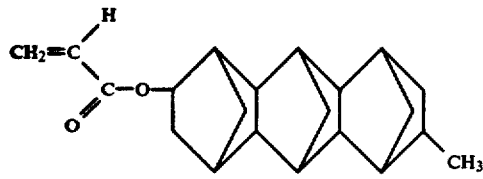 | 11-methylhexacyclo [6.6.1.1$^{3,6}$.1$^{10,13}$.0$^{2,7}$.0$^{9,14}$] heptadecyl-4-acrylate |
| 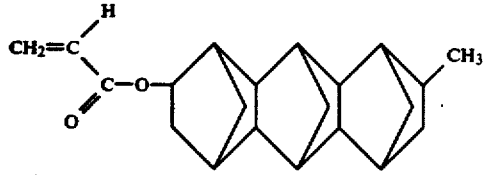 | 12-methylhexacyclo [6.6.1.1$^{3,6}$.1$^{10,13}$.0$^{2,7}$.0$^{9,14}$] heptadecyl-4-acrylate |
| 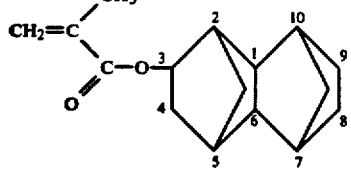 | Tetracyclo [4.4.0.1$^{2,5}$.1$^{7,10}$] dodecyl-3-methacrylate |
| 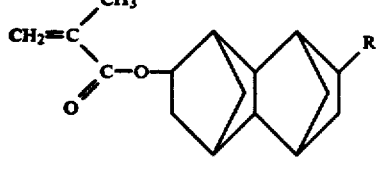 | 9-substituted-tetracyclo [4.4.0.1$^{2,5}$.1$^{7,10}$] dodecyl-3-methacrylate<br>R = methyl, ethyl, propyl, isobutyl, or hexyl |
| 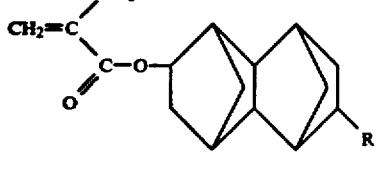 | 8-substituted-tetracyclo [4.4.0.1$^{2,5}$.1$^{7,10}$] dodecyl-3-methacrylate<br>R = methyl, ethyl, propyl, isobutyl, or hexyl |

| Chemical Formula | Name of the Compound |
| --- | --- |
| CH₂=C(CH₃)−C(=O)−O−[tetracyclic structure with R, R'] | 8,9-disubstituted-tetracyclo [4.4.0.1$^{2,5}$.1$^{7,10}$] dodecyl-3-methacrylate<br>R,R' = methyl, ethyl, propyl, isobutyl, or hexyl |
| CH₂=C(CH₃)−C(=O)−O−[tetracyclic structure with two CH₃] | 2,10-dimethyltetracyclo [4.4.0.1$^{2,5}$.1$^{7,10}$] dodecyl-3-methacrylate |
| CH₂=C(CH₃)−C(=O)−O−[tetracyclic structure with two CH₃] | 2,7-dimethyltetracyclo [4.4.0.1$^{2,5}$.1$^{7,10}$] dodecyl-3-methacrylate |
| CH₂=C(CH₃)−C(=O)−O−[hexacyclic structure numbered 1-14] | Hexacyclo [6.6.1.1$^{3,6}$.1$^{10,13}$.0$^{2,7}$.0$^{9,14}$] heptadecyl-4-methacrylate |
| CH₂=C(CH₃)−C(=O)−O−[hexacyclic structure with CH₃] | 11-methylhexacyclo [6.6.1.1$^{3,6}$.1$^{10,13}$.0$^{2,7}$.0$^{9,14}$] heptadecyl-4-methacrylate |
| CH₂=C(CH₃)−C(=O)−O−[hexacyclic structure with CH₃] | 12-methylhexacyclo [6.6.1.1$^{3,6}$.1$^{10,13}$.0$^{2,7}$.0$^{9,14}$] heptadecyl-4-methacrylate |

3. The resin composition according to claim 1, wherein said α,β-ethylenically unsaturated monomer having a reactive functional group is selected from the group consisting of monomers each having a hydroxyl group, monomers each having a carboxyl group, monomers each having an epoxy group, monomers each having an amide group, monomers each having an aminomethylol group, monomers each having an alkylated aminomethyl ether group, monomers each having an isocyanate group, monomers each having a cyclocarbonate group, monomers each having an acetoacetoxyalkyl group, monomers each having an aziridine group, monomers each having an amino group, monomers each having an acid anhydride group, monomers each having an alkenyl group and having no second terminal double bond, and mixtures thereof.

4. The resin composition according to claim 3, wherein said monomer having a hydroxyl group is selected from the group consisting of 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, dipentaerythritol hexa(meth)acrylate, addition products of ε-caprolactone (monomer to decamer) of 2-hydroxyethyl (meth)acrylate, addition products of ε-caprolactone (monomer to decamer) of 2-hydroxypropyl (meth)acrylate, and mixtures thereof.

5. The resin composition according to claim 3, wherein said monomer having a carboxyl group is selected from the group consisting of acrylic acid, methacrylic acid, itaconic acid, crotonic acid, maleic acid, fumaric acid and mixtures thereof.

6. The resin composition according to claim 3, wherein said monomer having an epoxy group is selected from the group consisting of glycidyl (meth)a- crylate, methylglycidyl (meth)acrylate, vinylglycidyl (meth)acrylate, and mixtures thereof.

7. The resin composition according to claim 3, wherein said monomer having an amide group is selected from the group consisting of acrylamide, methacrylamide and mixtures thereof.

8. The resin composition according to claim 3, wherein said monomer having an aminomethylol group is selected from the group consisting of N-methylolacrylamide, N-methylolmethacrylamide and mixtures thereof.

9. The resin composition according to claim 3, wherein said monomer having an alkylated aminomethyl ether group is selected from the group consisting of N-methoxymethyl acrylamide, N-methoxymethyl methacrylamide, N-butoxymethyl acrylamide, N-butoxymethyl methacrylamide, methyl acrylamideglycolatemethyl ether, and mixtures thereof.

10. The resin composition according to claim 3, wherein said monomer having an isocyanate group is selected from the group consisting of isocyanate ethyl (meth)acrylate, m-isopropenyl-$\alpha,\beta$-dimethylbenzyl isocyanate, a half-block product of isophorone diisocyanate and 2-hydroxyethyl (meth)acrylate, a half-block product of 1,6-hexamethylene diisocyanate and 2-hydroxyethyl (meth)acrylate, a half-block product of toluene diisocyanate and 2-hydroxyethyl (meth)acrylate, a half-block product of isophorone diisocyanate and 2-hydroxypropyl (meth)acrylate, a half-block product of 1,6-hexamethylene diisocyanate and 2-hydroxypropyl (meth)acrylate, a half-block product of toluene diisocyanate and 2-hydroxypropyl (meth)acrylate, and mixtures thereof.

11. The resin composition according to claim 3, wherein said monomer having a cyclocarbonate group is selected from the group consisting of 4-(meth)acryloyloxymethyl-1,3-dioxolan-2-one, 4-(meth)acryloyloxyethyl-1,3-dioxolan-2-one, and mixtures thereof.

12. The resin composition according to claim 3, wherein said monomer having an acetoacetoxyalkyl group is selected from the group consisting of acetoacetoxyethyl acrylate, acetoacetoxyethyl methacrylate, and mixtures thereof.

13. The resin composition according to claim 3, wherein said monomer having an aziridine group is 2-(1-aziridinyl)ethyl methacrylate.

14. The resin composition according to claim 3, wherein said monomer having an amino group is selected from the group consisting of aminoethyl (meth)acrylate, aminopropyl (meth)acrylate, methylaminoethyl (meth)acrylate, methylaminopropyl (meth)acrylate, ethylaminoethyl (meth)acrylate, ethylaminopropyl (meth)acrylate, dimethylaminoethyl (meth)acrylate, diethylaminopropyl (meth)acrylate, N-t-butylaminoethyl (meth)acrylate, N-t-butylaminopropyl (meth)acrylate, and mixtures thereof.

15. The resin composition according to claim 3, wherein said monomer having an acid anhydride group is selected from the group consisting of maleic anhydride, itaconic anhydride and mixtures thereof.

16. The resin composition according to claim 3, wherein monomer having an alkenyl group and having no terminal double bond is selected from the group consisting of an esterification product of (meth)acrylic acid and perilla oil fatty acid glycidyl ester, an esterification product of (meth)acrylic acid and soybean oil fatty acid glycidyl ester, an esterification product of (meth)acrylic acid and safflower oil fatty acid glycidyl ester, an esterification product of (meth)acrylic acid and linseed oil fatty acid glycidyl ester, an esterification product of glycidyl (meth)acrylate and perilla oil fatty acid, an esterification product of glycidyl (meth)acrylate and soybean oil fatty acid, an esterification product of glycidyl (meth)acrylate and safflower oil fatty acid, an esterification product of glycidyl (meth)acrylate and linseed oil fatty acid, an esterification product of methylglycidyl (meth)acrylate and perilla oil fatty acid, an esterification product of methylglycidyl (meth)acrylate and soybean oil fatty acid, an esterification product of methylglycidyl (meth)acrylate and safflower oil fatty acid, an esterification product of methylglycidyl (meth)acrylate and linseed oil fatty acid, and mixtures thereof.

17. The resin composition according to claim 1, wherein the content of said $\alpha,\beta$-ethylenically unsaturated monomer having a reactive functional group in the monomer mixture for the preparation of said copolymer ranges from 1 to 80 wt %, based on the total weight of the monomer mixture.

18. The resin composition according to claim 1, wherein said $\alpha,\beta$-ethylenically unsaturated monomer having no reactive functional group is selected from the group consisting of methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, cyclohexyl (meth)acrylate, benzyl (meth)acrylate, 2-ethylhexyl (meth)acrylate, stearyl (meth)acrylate, styrene, $\alpha$-methylstyrene, p-vinyltoluene, acrylonitrile and mixtures thereof.

19. The resin composition according to claim 1, wherein the content of said $\alpha,\beta$-ethylenically unsaturated monomer having no reactive functional group in the monomer mixture for the preparation of said copolymer ranges from 1 to 80 wt %, based on the total weight of the monomer mixture.

20. The resin composition according to claim 1, wherein said copolymer is further chemically modified to have a reactive functional group introduced by the chemical modification.

21. The resin composition according to claim 1, wherein said copolymer is curable without a hardener.

22. The resin composition according to claim 1, wherein a coating of said resin composition has an Rs value of not less than 86.

* * * * *